United States Patent [19]
Gollahon

[11] Patent Number: 6,145,929
[45] Date of Patent: Nov. 14, 2000

[54] SLIDING INSERT FOR A FISHING CHAIR

[76] Inventor: Robert Gollahon, 2340 Kings Hwy., King George, Va. 22485

[21] Appl. No.: 09/280,077

[22] Filed: Mar. 29, 1999

[51] Int. Cl.[7] .................................................. A47C 1/023
[52] U.S. Cl. .................................. 297/344.1; 297/344.11; 297/440.15; 297/440.16; 248/393; 248/424; 248/429
[58] Field of Search ........................... 297/344.1, 344.11, 297/448.22, 440.24, 440.16, 440.15; 248/424, 429, 430, 372.1, 393

[56] References Cited

U.S. PATENT DOCUMENTS

| | | | |
|---|---|---|---|
| 2,959,208 | 11/1960 | Tanaka et al. | 248/393 |
| 3,151,910 | 10/1964 | Larson . | |
| 3,325,137 | 6/1967 | Knudsen | 248/424 |
| 3,542,326 | 11/1970 | Reapsummer | 248/424 |
| 3,851,916 | 12/1974 | Quartullo . | |
| 3,924,891 | 12/1975 | Williams | 248/429 X |
| 3,939,106 | 2/1976 | Dunleavy et al. | 260/2.5 AM |
| 4,025,110 | 5/1977 | Poorman | 248/393 X |
| 4,086,676 | 5/1978 | Arruza . | |
| 4,533,110 | 8/1985 | Hill | 248/393 X |
| 4,771,975 | 9/1988 | Johnson et al. | 248/393 |
| 4,860,510 | 8/1989 | Kotler | 52/177 |
| 4,879,963 | 11/1989 | Dionne . | |
| 5,018,696 | 5/1991 | Siegrist | 248/429 |
| 5,171,063 | 12/1992 | Stidd | 297/344.1 |
| 5,269,590 | 12/1993 | Carilli | 297/DIG. 1 X |
| 5,443,239 | 8/1995 | Laporte | 297/440.2 X |
| 5,472,165 | 12/1995 | Gruber | 248/424 |
| 5,473,958 | 12/1995 | Jeck et al. | 248/429 X |
| 5,603,551 | 2/1997 | Sheehan | 297/344.1 X |
| 5,785,387 | 7/1998 | Hernandez et al. | 248/429 X |
| 5,954,403 | 9/1999 | Mock et al. | 297/DIG. 1 X |

*Primary Examiner*—Peter M. Cuomo
*Assistant Examiner*—Rodney B. White
*Attorney, Agent, or Firm*—Klima & Pezzlo, P.C.

[57] ABSTRACT

A sliding insert for a fishing chair includes a bottom portion; a top portion; a bearing assembly located between the bottom and top portions such that the top portion is slidable relative to the bottom portion; and a first holding plate located on a rear end of the bottom portion for attaching the bottom portion to the fishing chair by inserting the first holding plate in a backrest support located on a rear of a seat of the fishing chair.

28 Claims, 4 Drawing Sheets

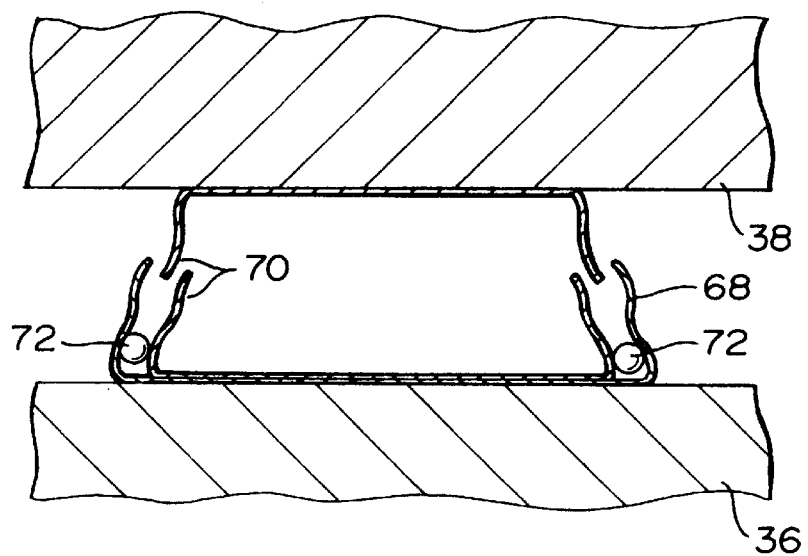
FIG. 12
FIG. 13
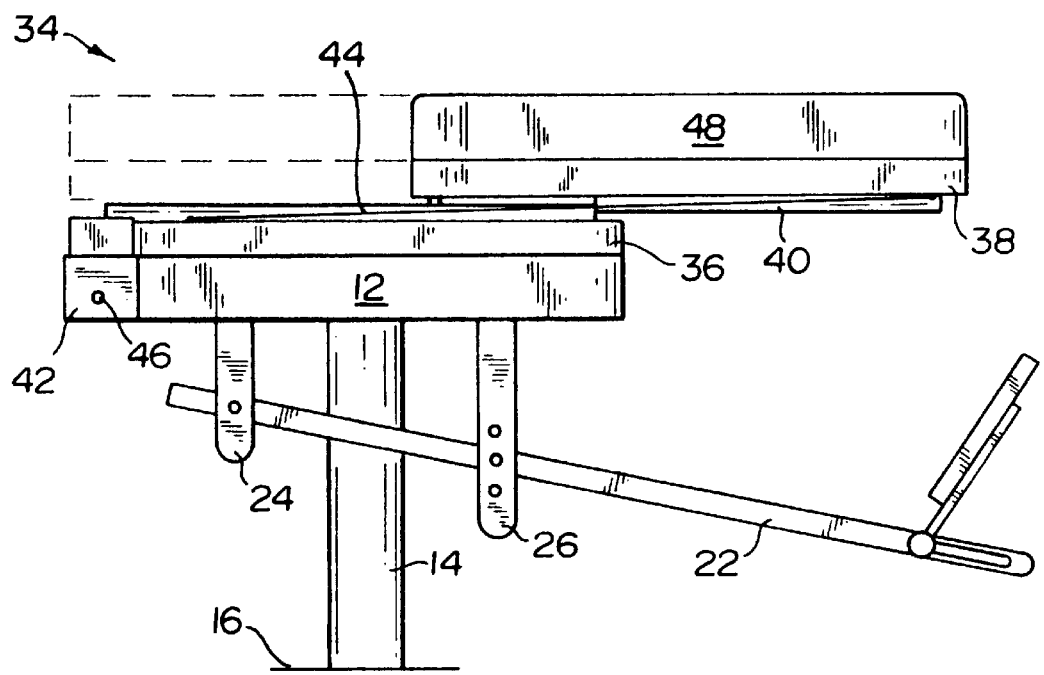

SLIDING INSERT FOR A FISHING CHAIR

BACKGROUND OF THE INVENTION

The present invention relates in general to sport fishing chairs (fighting chairs) and, in particular, to fishing chairs with a sliding insert.

When fishing for large game fish such as blue marlin, black marlin, bluefin tuna and the like, it is customary for the fisherman to sit in a so-called fishing chair mounted on the aft deck of a power boat. The conventional fishing chair has an upstanding back rest and a seat both of which are mounted to pivot about an upright axis on a pedestal mounted to the boat deck. A foot rest extends outwardly from the seat portion of the chair to enable the fisherman to brace himself while landing a fish. A rod holder is mounted to the front of the chair for receiving the butt end of a fishing rod between the fisherman's legs. The rod holder is designed to pivot about a horizontal axis so that the fisherman may work the rod and reel back and forth while reeling in a fish.

Customarily, the fisherman sits in a bucket-type harness which is attached to the reel, and he usually uses his left hand to pump the rod. A lubricant such as a soap solution is squirted on the chair seat to enable the fisherman and his bucket-type harness to slide on the fishing chair; however, this is unsatisfactory for the following reasons: (1) It requires the aid of an assistant to supply lubricant; (2) It creates an unsafe condition if lubricant works off the edge of the seat and spills onto the deck; (3) Due to variation in the amount of friction between the bucket harness and the seat, a smooth back and forth motion is often lost; and (4) The bucket-type harness often works off the buttocks of the fisherman and moves up his back.

Landing one of the aforementioned game fish species is a strenuous and time-consuming endeavor. Depending upon the size of the fish, it is not uncommon for even a muscular fisherman to spend 4 to 8 hours in landing the fish. Customarily, the fisherman employs his arms, shoulders and back muscles to pivot the rod rearwardly into an upright position, and while lowering the rod, he reels rapidly to maintain tension on the line while simultaneously shortening it. This procedure is effective; however, it has a tendency to overstress certain of the body muscles and to induce fatigue. The typical fighting chair, when used with a bucket harness, does not allow for a cushion seat and therefore often causes early fatigue, muscle cramps and buttocks and leg sleep and/or numbness. A fishing chair which enables a fisherman to shorten the time required to land a game fish and/or to land a game fish with less muscle strain is highly desirable.

An auxiliary seat assembly for a sport fishing chair is known from U.S. Pat. No. 4,086,676 issued on May 2, 1978 to Arruza, which patent is hereby expressly incorporated by reference. The Arruza patent is an improvement over using a soap solution as a lubricant between the seat harness and the seat of the fishing chair. However, there are several disadvantages to using the auxiliary seat assembly of Arruza.

First, Arruza shows the auxiliary seat assembly attached to the fishing chair using screws or bolts. The use of screws or bolts is undesirable because the holes in the fishing chair ruin the appearance of the fishing chair when the auxiliary seat assembly is removed. A fishing chair may cost $8,000 to $10,000 and is in the class of a piece of fine furniture. It is very undesirable to ruin such an expensive item by boring holes in it. Additionally, the holes allow fresh and salt water to penetrate into the interior of the fishing chair wood, thereby causing deterioration of the chair.

Second, the Arruza device is made of wood, which is easily damaged by the marine environment of hot and cold temperatures and fresh and salt water. As the wood deteriorates, it becomes structurally inferior and can cause the sliding motion of the auxiliary seat assembly to bind or lock up completely.

Third, the sliding system of Arruza includes rails made of metal and guide elements made of nylon. Because the rail and guide materials are different, with different coefficients of thermal expansion, the extremes of heat and cold encountered in the marine environment can cause the rail and guide system to bind or lock up.

Fourth, the device of Arruza lacks an automatic return mechanism to return the top portion of the seat assembly to a retracted position from an extended position. When the seat assembly of Arruza is extended and the fisherman is pulled upward off the seat by a large fish, the seat assembly remains in the extended position. Often when the fisherman is pulling backward on the fish, the fisherman will fall back rather quickly to his starting position onto the seat assembly rather than sliding back with his full body weight on the chair. This is due to the weight and pull of the fish acting thru the counter leverage of the rod assembly holding the fisherman's weight up off the seat while the fisherman is moving in the backward position. In the Arruza device, if the fisherman has not manually returned the top portion to the retracted position, the fisherman will land with his buttocks on the exposed guide and rail system. The fisherman at a minimum will experience discomfort, and may injure himself, especially after repeated episodes.

Fifth, the top surface of the top portion of the Arruza device is simply a flat wood surface. As discussed above, eight hours or more may elapse before a fish is landed. Sitting on a hard wood surface for such a long period of time is at best uncomfortable and possibly intolerable. The plain wood surface is particularly undesirable if the fish is strong enough to raise the fisherman from the seat so that when the fisherman pulls back on the fish he or she returns to the seat almost in a free-fall style, as previously discussed. These quick transitions from standing to sitting are jarring to the body when the seat surface is hard, such as wood.

SUMMARY OF THE INVENTION

It is an object of the present invention to provide an apparatus for use with a fishing chair that allows a fisherman to slide back and forth with respect to the seat of the fishing chair.

It is another object of the present invention to provide a sliding insert for a fishing chair that overcomes the shortcomings of the prior art.

It is a further object of the present invention to provide a sliding insert that can be attached and removed from a fishing chair without damaging the appearance or weather-tight integrity of the fishing chair.

It is still another object of the present invention to provide a sliding insert for a fishing chair that can withstand the marine environment.

It is yet another object of the present invention to provide a sliding insert for a fishing chair having a bearing assembly that functions well in extremes of hot and cold and when exposed to fresh and/or salt water.

Another object of the present invention is to provide a sliding insert for a fishing chair that automatically returns from an extended position to a retracted position.

Still another object of the present invention to provide a sliding insert for a fishing chair that includes a comfortable seating surface.

These and other objects of the present invention are achieved by a sliding insert for a fishing chair comprising a bottom portion; a top portion; a bearing assembly located between the bottom and top portions such that the top portion is slidable relative to the bottom portion; and a first holding plate located on a rear end of the bottom portion for attaching the bottom portion to the fishing chair by inserting the first holding plate in a backrest support located on a rear of a seat of the fishing chair.

The sliding insert may further comprise a second holding plate located on the rear end of the bottom portion for attaching the bottom portion to the fishing chair by inserting the second holding plate in a backrest support, the second holding plate being located on a side of the bottom portion opposite the first holding plate.

The holding plates may each have a hole formed therein, the sliding insert further comprising a pair of fasteners for fastening each holding plate to its respective backrest support.

Preferably, the sliding insert further comprises a cushion attached to the top portion. The cushion is advantageously made of closed cell foam.

In a preferred embodiment, the top and bottom portions of the sliding insert comprise a plastic material.

Preferably, the sliding insert further comprises a retractor attached to the top and bottom portions for automatically returning the top portion from an extended position to a retracted position.

Another aspect of the invention is, in combination with a fishing chair having a seat including a pair of backrest supports attached to a rear of the seat, a sliding insert comprising a bottom portion; a top portion; a bearing assembly located between the bottom and top portions such that the top portion is slidable relative to the bottom portion; and a first holding plate located on a rear end of the bottom portion for attaching the bottom portion to the fishing chair, the first holding plate being inserted in one of the backrest supports.

The combination may further comprise a second holding plate located on the rear end of the bottom portion for attaching the bottom portion to the fishing chair, the second holding plate being located on a side of the bottom portion opposite the first holding plate and being inserted in the other of the backrest supports.

Further objects, features and advantages of the present invention will become apparent from the following detailed description taken in conjunction with the accompanying drawing.

BRIEF DESCRIPTION OF THE DRAWINGS

FIG. 12 is an enlarged fragmentary view of the slide used in the sliding insert of the present invention.

FIG. 13 is a side view of the sliding insert of the present invention installed on a fishing chair.

DETAILED DESCRIPTION OF THE PREFERRED EMBODIMENTS

Figure 1:
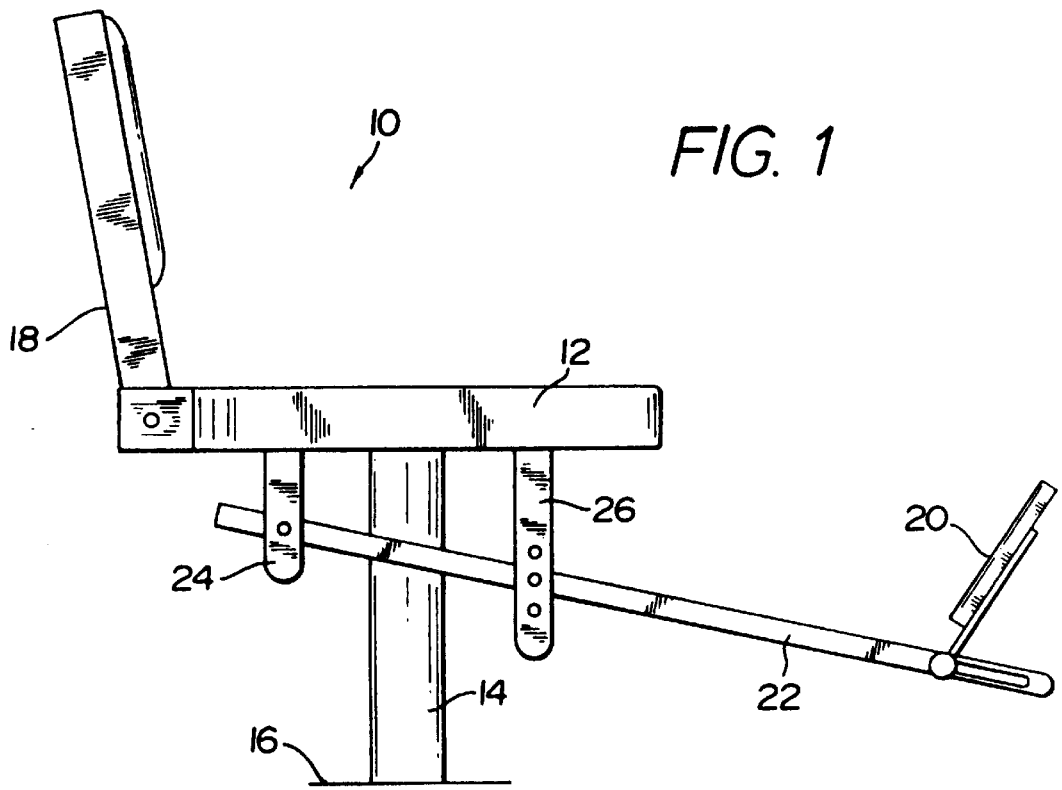
FIG. 1 is a side view of an exemplary conventional fishing chair.

FIG. 1 is a side view of an example of a conventional fishing chair 10. The fishing chair 10 includes a seat 12 mounted to pivot about a vertical axis on a pedestal 14 which is mounted at its lower end to the aft deck 16 of a boat. The fishing chair 10 has a backrest 18 mounted at its lower end to the rear of the chair seat 12. Arm rests (not shown) may be mounted on each side of the chair seat 12. A footrest 20 is located in front of the chair seat 12. The footrest 20 is adjustably secured to the seat 12 by a pair of struts, such as the strut 22, which is releasably connected to a pair of stanchions 24 and 26 depending from the under side of the seat 12. A rod holder or gimbal (not shown) is mounted to pivot about a horizontal axis at the front center of the seat 12. The rod holder receives the butt end of a fishing rod and enables the rod to pivot back and forth. A conventional harness assembly (not shown) straps around the lower portion of a fisherman's body and is connected to the reel.

Figure 2:
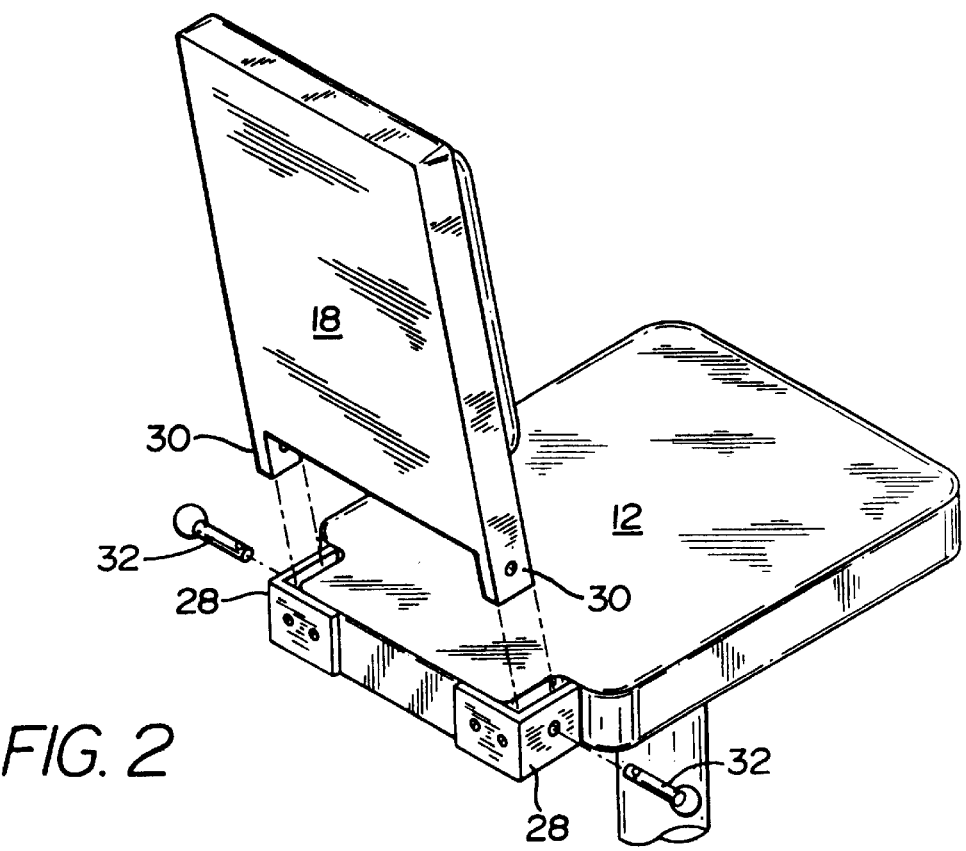
FIG. 2 shows the connection between the backrest and the seat of the chair of FIG. 1.

FIG. 2 shows how the backrest 18 is removably attached to the seat 12 of the fishing chair 10. A pair of backrest supports 28 are attached to the rear of the seat 12. The backrest supports 28 define an opening into which the backrest plates 30 are inserted. A pair of clip pins 32 or other type of fastener are placed through holes in the backrest supports 28 and in the backrest plates 30 thereby fastening the backrest 18 to the seat 12.

Figure 5:
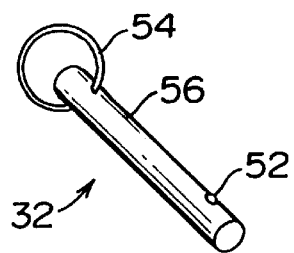
FIG. 5 shows a clip pin.

FIG. 5 shows a typical clip pin 32. The clip pin 32 includes a ring 54 for pulling the clip pin 32, a shaft 56 and a spring-loaded ball 52. When the clip pin 32 is inserted through a hole, the spring-loaded ball 52 depresses into the shaft 56 to allow passage of the pin through the hole. After the pin 32 is completely inserted through the hole, the spring-loaded ball 52 springs upward thereby providing a locking mechanism to keep the clip pin 32 from inadvertently being removed from the hole. Other fasteners such as bolts and nuts may be used rather than the clip pin 32.

Figure 3:
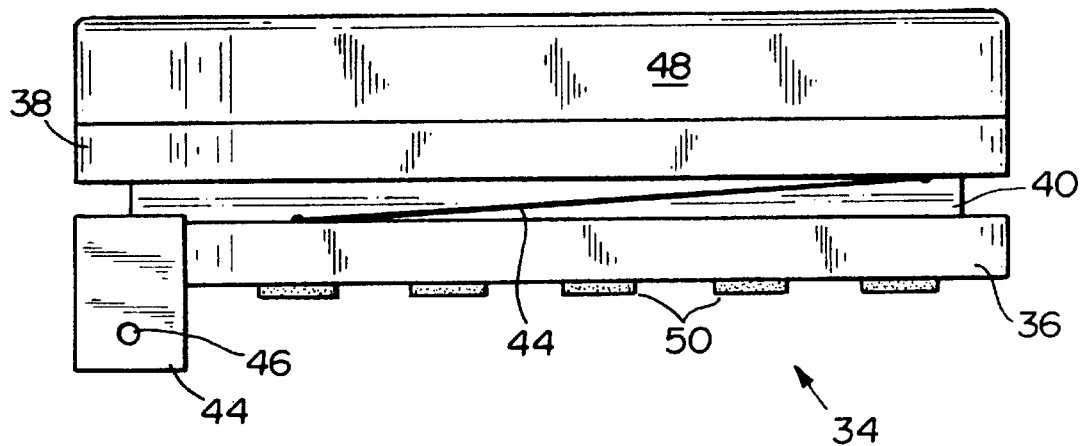
FIG. 3 is a side view of a sliding insert according to the present invention.

FIG. 3 is a side view of the sliding insert 34 of the present invention. The sliding insert includes a bottom portion 36, a top portion 38 and a bearing assembly 40 located between the top and bottom portions 38, 36. The bearing assembly 40 allows the top portion 38 to slide forward relative to the bottom portion 36. At least one holding plate 42 is located at the rear end of the sliding insert 34. The holding plate 42 includes a hole 46 formed therein.

Figure 4:
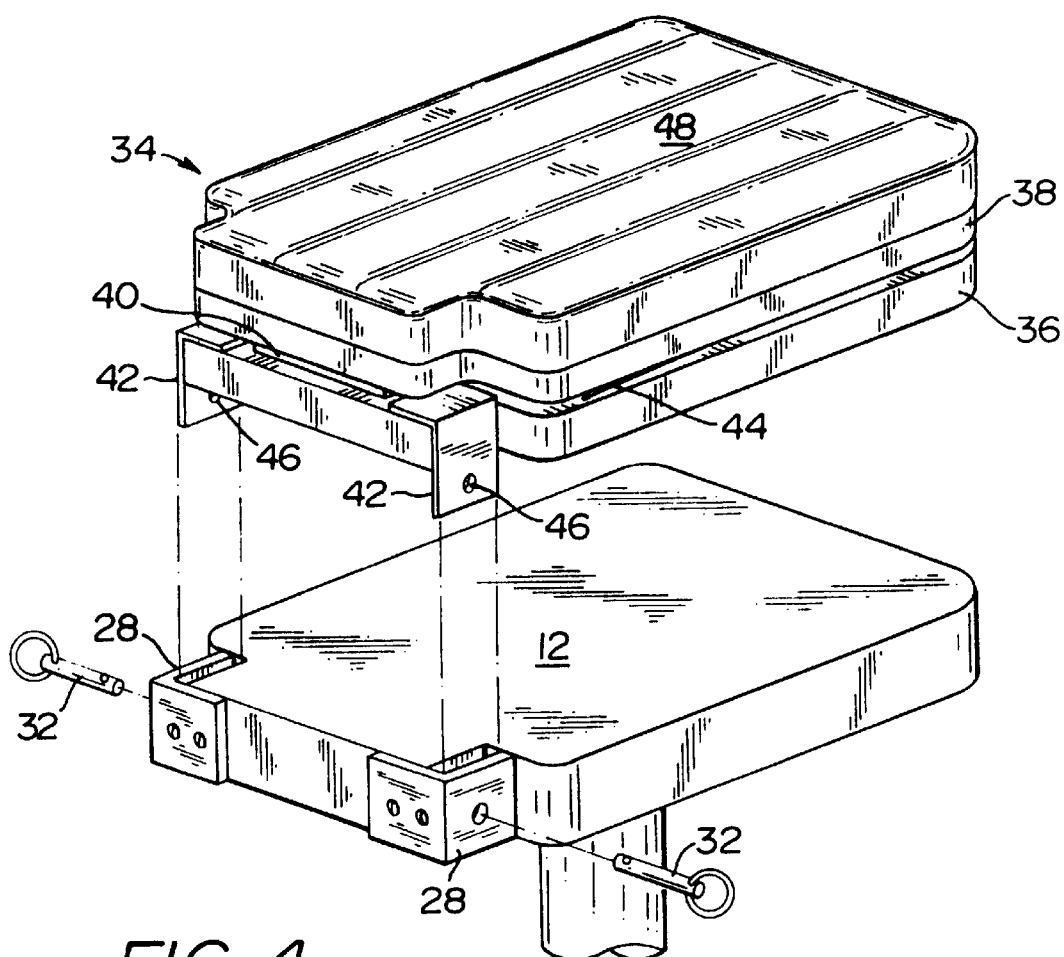
FIG. 4 shows the connection between the sliding insert and the fishing chair.

As shown in FIG. 4, the holding plate 42 attaches the bottom portion 36 of the sliding insert 34 to the seat 12 of the fishing chair 10 by inserting the holding plate 42 into a backrest support 28 located on a rear of the seat 12 of the fishing chair. Preferably, a second holding plate 42 is located on the rear end of the bottom portion 36 of the insert 34. The second holding plate 42 is located on a side of the bottom portion 36 opposite the first holding plate 42. The second holding plate 42 is also inserted into a backrest support 28 and a clip pin 32 or other fastener is used to fasten the holding plates 42 to the backrest supports 28.

Referring to FIG. 3, the sliding insert 34 further comprises a cushion 48 attached to the top portion 38 of the sliding insert 34. The cushion is preferably made of closed cell foam of about 3 inches thickness. The closed cell foam prevents the cushion from taking on water. The cushion 48 may be attached to the top portion 38 by stapling or otherwise. The cover of the cushion 48 may be vinyl, NAUGAHYDE, or another material which is resistant to the marine environment.

The top and bottom portions 38, 36 are preferably made of a durable plastic material which is resistant to the marine environment, for example, polyurethane.

Figure 7:
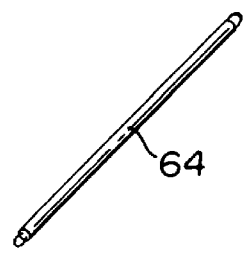
FIG. 7 shows an elastic cord.
Figure 8:
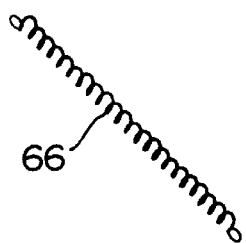
FIG. 8 shows a spring.

The sliding insert 34 further comprises a retractor 44 attached to opposite ends of the top and bottom portions 38, 36 for automatically returning the top portion 38 from an extended position to a retracted position. The retractor 44 may take a variety of forms. For example, the retractor 44 may comprise an elastic cord (See FIG. 7), such as a bungee cord, with ends attached at opposite ends of the top and bottom portions 38, 36, respectively. In another for the retractor 44 may be a spring (See FIG. 8) which is similarly attached to opposite ends of the top and bottom portions.

Preferably, the peripheral shapes of the top and bottom portions 3 8, 3 6 are substantially the same as the peripheral shape of the seat 12 of the fishing chair 10. The fishing chair 10 is more aesthetically pleasing when the sliding insert 34 has substantially the same contour as the seat 12 of the fishing chair 10.

Figure 6:
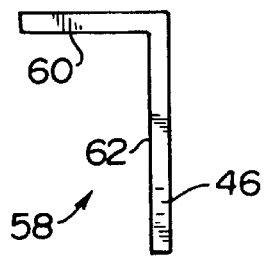
FIG. 6 shows a substantially right angle bracket.

As shown in FIG. 6, the holding plates 42 may comprise a substantially right angle bracket 58 including arms 60, 62. One arm 60 of the bracket 58 is attached to the bottom portion 36 of the sliding insert by, for example, screws. The second arm 62 of the bracket including a hole 46 for receiving a fastener is configured for insertion into a backrest support 28 attached to the seat 12 of the fishing chair.

Figure 9:
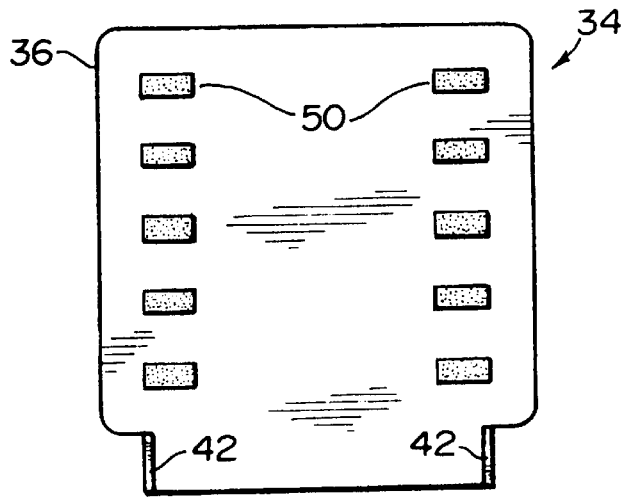
FIG. 9 is a bottom view of the bottom portion of the sliding insert of the present invention.

As shown in FIG. 9, the bottom surface of the bottom portion 36 may include cushioning pads 50. The cushioning pads 50 help prevent any inadvertent movement of the bottom portion 36 with respect to the seat 12 and also protect the finish of the seat 12. The cushioning pads 50 may be made of, for example, rubber or a synthetic elastic material. The cushioning pads 50 have an adhesive side for attachment to the bottom surface of the bottom portion 36.

Figure 10:
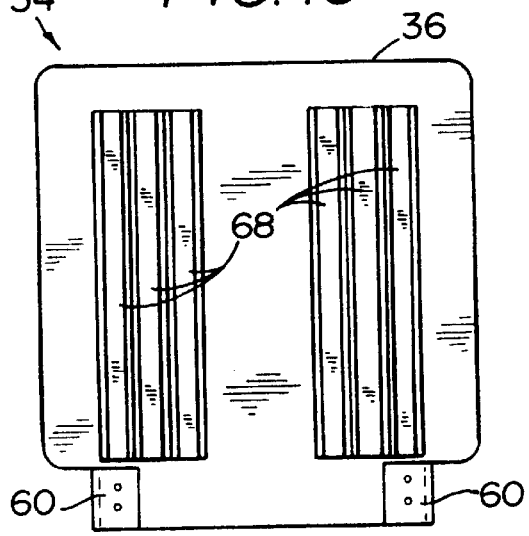
FIG. 10 is a top view of the bottom portion of the sliding insert of the present invention.

FIG. 10 is a top view of the bottom portion 36. The bearing assembly 40 which allows the top portion 38 to slide relative to the bottom portion 36 is a conventional slide, such as Slide Model 8400 manufactured by Knape & Vogt Manufacturing Company of Grand Rapids, Mich. This conventional slide includes a guide rail 68 which is attached to the top surface of the bottom portion 36 of the insert 34. At least two guide rails 68 are needed. However, to ensure smooth sliding and structural stability, more than two guide rails 68 may be used. For example, FIG. 10 shows three guide rails 68 on each side of the bottom portion 36. Space permitting, the number of guide rails 68 may be as many as desired.

Figure 11:
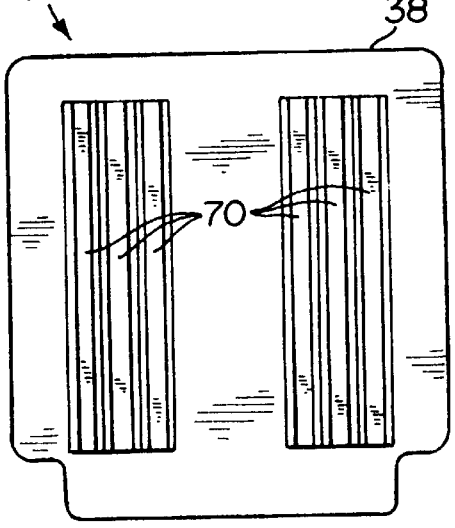
FIG. 11 is a bottom view of the top portion of the sliding insert of the present invention.

FIG. 11 shows the bottom surface of the top portion 38 of the sliding insert 34. A plurality of nested rails 70 are attached to the bottom surface of the top portion 38. As best shown in FIG. 12, the nested rails 70 fit into the guide rails 68 on the top surface of the bottom portion 36. The nested rails 70 slide with respect to the guide rails 68 on ball bearings 72. A ball bearing slide assembly such as the Knape & Vogt system is very dependable under marine conditions.

FIG. 13 shows the sliding insert 34 installed on the chair 10. The sliding insert 34 is shown in an extended position. The broken lines show the sliding insert in the retracted position. The amount of extension of the top portion with respect to the bottom portion may be varied by fixing stops in the slides in a known manner. It has been found that 8 to 10 inches is a reasonable amount of extension.

The backrest 18 of the chair 10 is removed by removing the clip pins 32 from the backrest supports 28 and the backrest plates 30. The insert 34 is then mounted on the chair 10 by sliding the holding plates 42 into the backrest supports 28. The clip pins 32 or other fasteners are then inserted through the holes in the backrest supports 28 and the holes 46 in the holding plates 42. The top portion 38 extends forward by means of the bearing assembly 40 located between the top and bottom portions 36, 38. The top portion 38 will automatically return to its retracted position by action of the retractor 44.

It is desired to remove the sliding insert 34, the clip pins 32 are removed and the sliding insert 34 is easily lifted off the seat 12 of the chair 10. The backrest 18 may then be reinstalled by inserting the backrest plates 30 into the backrest supports 28 and fastening with the clip pins 32. The installation, use and removal of the sliding insert 34 causes no damage to the fishing chair 10.

While the invention has been described with reference to certain preferred embodiments, numerous modifications, alterations and changes to the described embodiments are possible without departing from the spirit and scope of the invention, as defined in the appended claims and equivalents thereof.

What is claimed is:

1. A sliding insert for a fishing chair having at least one backrest support located on a rear of a seat of the fishing chair, comprising:
   a bottom portion;
   a top portion;
   a bearing assembly located between the bottom and top portions such that the top portion is slidable relative to the bottom portion;
   a first holding plate located on a rear end of the bottom portion for attaching the bottom portion to the fishing chair by inserting the first holding plate in the backrest support located on a rear of the seat of the fishing chair; and
   a retractor attached to the top and bottom portions for automatically returning the top portion from an extended position to a retracted position.

2. The sliding insert of claim 1 further comprising a second holding plate located on the rear end of the bottom portion for attaching the bottom portion to the fishing chair by inserting the second holding plate in another backrest support, the second holding plate being located on a side of the bottom portion opposite the first holding plate.

3. The sliding insert of claim 2 wherein the holding plates each have a hole formed therein, the sliding insert further comprising a pair of fasteners for fastening each holding plate to its respective backrest support.

4. The sliding insert of claim 3 wherein each holding plate comprises a substantially right angle bracket with one arm of the bracket attached to the bottom portion of the sliding insert and a second arm of the bracket having the hole for receiving a pin which secures the holding plate to the fishing chair, the second arm being configured for insertion in a backrest support attached to the seat of the fishing chair.

5. The sliding insert of claim 3 further comprising a cushion attached to the top portion.

6. The sliding insert of claim 4 wherein the cushion is made of closed cell foam.

7. The sliding insert of claim 1 wherein the top and bottom portions comprise a plastic material.

8. The sliding insert of claim 7 wherein the plastic material is polyurethane.

9. The sliding insert of claim 1 wherein the retractor comprises an elastic cord.

10. The sliding insert of claim 1 wherein the retractor comprises a spring.

11. The sliding insert of claim 1 wherein peripheral shapes of the top and bottom portions are substantially the same as a peripheral shape of a seat of the fishing chair.

12. The sliding insert of claim 1 further comprising cushioning pads attached to a bottom surface of the bottom portion.

13. The sliding insert of claim 1 wherein the bearing assembly comprises a slide having rails and ball bearings.

14. In combination with a fishing chair having a seat including a pair of backrest supports attached to a rear of the seat, a sliding insert comprising:

a bottom portion;

a top portion;

a bearing assembly located between the bottom and top portions such that the top portion is slidable relative to the bottom portion;

a first holding plate located on a rear end of the bottom portion configured for attaching the bottom portion to the fishing chair, the first holding plate being configured to be inserted in one of the backrest supports for connecting the sliding insert to the fishing chair.

15. The combination of claim 14 further comprising a second holding plate located on the rear end of the bottom portion configured for attaching the bottom portion to the fishing chair, the second holding plate being located on a side of the bottom portion opposite the first holding plate and being configured to be inserted in the other of the backrest supports.

16. The combination of claim 15 wherein the holding plates each have a hole formed therein and the backrest supports have holes formed therein, the combination further comprising a pair of fasteners which fasten each holding plate to its respective backrest support.

17. The combination of claim 16 wherein each holding plate comprises a substantially right angle bracket with one arm of the bracket attached to the bottom portion of the sliding insert and a second arm of the bracket having the hole for receiving a pin which secures the holding plate to the fishing chair, the second arm being configured for insertion in a backrest support attached to the seat of the fishing chair.

18. The combination of claim 16 wherein the fasteners are clip pins having a spring loaded ball at one end to prevent the clip pin from inadvertent removal from the backrest support and holding plate.

19. The combination of claim 16 further comprising a cushion attached to the top portion.

20. The combination of claim 19 wherein the cushion is made of closed cell foam.

21. The combination of claim 14 wherein the top and bottom portions comprise a plastic material.

22. The combination of claim 20 wherein the plastic material is polyurethane.

23. The combination of claim 14 further comprising a retractor attached to the top and bottom portions for automatically returning the top portion from an extended position to a retracted position.

24. The combination of claim 23 wherein the retractor comprises an elastic cord.

25. The combination of claim 24 wherein the retractor comprises a spring.

26. The combination of claim 14 wherein peripheral shapes of the top and bottom portions are substantially the same as a peripheral shape of a seat of the fishing chair.

27. The combination of claim 14 further comprising cushioning pads attached to a bottom surface of the bottom portion.

28. The combination of claim 14 wherein the bearing assembly comprises a slide having rails and ball bearings.

* * * * *